United States Patent
Bilich et al.

(10) Patent No.: US 10,783,916 B1
(45) Date of Patent: Sep. 22, 2020

(54) PASSIVATED NITROGENATED DIAMOND-LIKE CARBON LAYER AND METHOD FOR PASSIVATING IT

(71) Applicant: Western Digital Technologies, Inc., Irvine, CA (US)

(72) Inventors: Daniel Bilich, Capitola, CA (US); Thomas E. Karis, Aromas, CA (US); Andrey Ovcharenko, Gilroy, CA (US); Raj Thangaraj, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 575 days.

(21) Appl. No.: 15/446,818

(22) Filed: Mar. 1, 2017

(51) Int. Cl.
  *G11B 5/84* (2006.01)
  *G11B 5/725* (2006.01)
  *G11B 5/60* (2006.01)

(52) U.S. Cl.
  CPC .......... *G11B 5/8408* (2013.01); *G11B 5/6082* (2013.01); *G11B 5/725* (2013.01)

(58) Field of Classification Search
  CPC ..... G11B 5/8408; G11B 5/6082; G11B 5/725; G11B 5/72
  See application file for complete search history.

(56) References Cited

U.S. PATENT DOCUMENTS 6,150,001 A * 11/2000 Hedrick ................. G11B 5/725
  428/336
2012/0183887 A1* 7/2012 Iseki ..................... C23C 16/503
  429/518

OTHER PUBLICATIONS

Kaufman et al., Phys Rev B vol. 39, p. 13053, Jun. 1989 (Year: 1989).*
Fang et al., Prog. Polym. Sci., vol. 20, pp. 61-118, 1995.*

* cited by examiner

*Primary Examiner* — Holly C Rickman
(74) *Attorney, Agent, or Firm* — Thomas R. Berthold

(57) ABSTRACT

A nitrogenated diamond-like carbon (DLC) layer, like a nitrogenated DLC overcoat on a magnetic recording disk, includes cyanoacrylates that are attached to nitrogenated sites on the surface of the carbon layer. Cyanoacrylates are reactive with surface amine groups, which are among the nitrogenated surface sites that act as adsorption sites for volatile contaminants in the disk drive. The covalent bonding of the cyanoacrylate with the amine groups and other reactive sites on the disk overcoat blocks the adsorption of contaminants when they impinge on the overcoat surface. The cyanoacrylate may be applied to the overcoat by dipping the disk into a solution containing the cyanoacrylate or by exposing the overcoat to a cyanoacrylate vapor.

20 Claims, 5 Drawing Sheets

| Line Number | Cyanoacrylate Concentration (g/L) | [C=O] (au) | Lubricant Thickness (nm) | Contaminant Challenge Test Score mean | Contaminant Challenge Test Score +/-Δ 90% CI |
|---|---|---|---|---|---|
| 1 | 0 | 0 | 1.19 | 72 | 4 |
| 2 | 0.4 | 0.032 | 1.17 | 10 | 1 |
| 3 | 1.6 | 0.068 | 1.09 | 0 | 1 |
| 4 | 0.8 | 0.050 | 0.88 | 0 | 1 |
| 5 | 1.6 | 0.068 | 0.84 | 0 | 1 |
| 6 | 0 | 0 | 0 | 363 | 15 |
| 7 | 0.4 | 0.032 | 0 | 243 | 30 |
| 8 | 0.8 | 0.050 | 0 | 74 | 31 |
| 9 | 1.6 | 0.068 | 0 | 0 | 4 |

| Line Number | Cyanoacrylate Concentration (g/L) | [C=O] (au) | Lubricant Thickness (nm) | Contaminant Challenge Test Score | |
|---|---|---|---|---|---|
| | | | | mean | +/-Δ 90% CI |
| 1 | 0 | 0 | 1.19 | 72 | 4 |
| 2 | 0.4 | 0.032 | 1.17 | 10 | 1 |
| 3 | 1.6 | 0.068 | 1.09 | 0 | 1 |
| 4 | 0.8 | 0.050 | 0.88 | 0 | 1 |
| 5 | 1.6 | 0.068 | 0.84 | 0 | 1 |
| 6 | 0 | 0 | 0 | 363 | 15 |
| 7 | 0.4 | 0.032 | 0 | 243 | 30 |
| 8 | 0.8 | 0.050 | 0 | 74 | 31 |
| 9 | 1.6 | 0.068 | 0 | 0 | 4 |

PASSIVATED NITROGENATED DIAMOND-LIKE CARBON LAYER AND METHOD FOR PASSIVATING IT

BACKGROUND

Field of the Invention

This invention relates generally to nitrogenated "diamond-like" carbon (DLC) layers, and more particularly to such DLC layers as protective overcoats in magnetic recording disk drives.

Description of the Related Art

FIG. 1 is a block diagram of a conventional magnetic recording hard disk drive with the cover removed. The disk drive includes a magnetic recording disk 10 and a rotary voice coil motor (VCM) actuator 17 supported on a disk drive housing or base 18. The disk 10 has a magnetic recording layer with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. The drive housing or base 18 and cover (not shown) provide a generally sealed enclosure for the disk drive. Typically, there are multiple disks stacked on a hub that is rotated by the spindle motor, with a separate slider and read/write head associated with each disk surface.

FIG. 2 is a side sectional schematic of an enlarged portion of the disk 10 and slider 22. The disk 10 includes a disk substrate 100 with a magnetic recording layer 102. The recording layer 102 may be a stack of layers including one or more ferromagnetic layers. A DLC overcoat 104 with a surface layer 104a is formed on the recording layer 102. The surface layer 104a is a thin surface layer of nitrogen-enriched carbon or "nitrogenated" carbon. Nitrogenated DLC overcoats for magnetic recording disks are well-known. They may be formed by various methods, for example by sputter deposition of a carbon target in the presence of nitrogen, or by low-energy ion implantation of nitrogen onto a DLC overcoat, resulting in an upper surface of carbon that contains nitrogen. They typically contain between 8 and 18 atomic percent nitrogen and are typically between about 1 and 3 nm thick. The overcoat 104 is depicted with the nitrogenated surface layer 104a. The disk 10 also includes a layer 106 of a liquid lubricant, typically a perfluoropolyether (PFPE), formed on the overcoat 104. The lubricant is typically between 0.9 and 1.2 nm thick and is thus typically a permeable film on the overcoat 104. Because the lubricant layer 106 is very thin and may not always cover the entire surface layer 104a it is depicted schematically as a discontinuous layer with portions of the nitrogenated surface layer 104a exposed.

The slider 22 is typically formed of a ceramic material, like a titanium-carbide-alumina ceramic, and has an overcoat 22a with an air-bearing surface 22b that faces the disk 10. The slider overcoat 22a may be formed of DLC or, in some cases nitrogenated DLC, like the disk overcoat 104.

SUMMARY

Disk drives contain volatile contaminants that are present in the drive internal components or permeate into the drive from the external environment. The contaminants adsorb to reactive nitrogen surface sites on the disk carbon overcoat. This leads to the formation of smears on the air-bearing surfaces of the sliders, resulting in head-disk spacing loss and failures of the head-disk interface. The adsorption of contaminants onto the nitrogenated surface sites is minimized by the PFPE lubricant, which contains multiple hydroxyl group substituents that physisorb and chemisorb to the surface sites. However, this requires a relatively thick layer of PFPE, which increases the head-disk spacing. For example, referring to FIG. 2, the lubricant layer 106 would be required to be thick enough to completely cover the nitrogenated surface layer 104a. Thus, what is needed is a disk with an overcoat containing nitrogenated surface sites that are passivated, so that contaminant smears are not formed on the sliders.

In embodiments of this invention the disk overcoat includes cyanoacrylates that are attached to the nitrogenated surface sites. Cyanoacrylates refer to the same class of compounds as cyanoacrylic acid esters, but are often meant to refer to just the commonly used adhesive forms of the ester, for example, ethyl-cyanoacrylate and methyl-cyanoacrylate. As used herein cyanoacrylates shall mean the same class of compounds as cyanoacrylic acid esters. Cyanoacrylates are especially reactive with surface amine groups, which are among the nitrogenated surface sites that act as adsorption sites for volatile organic and organosilicon contaminants. Organosilicon compounds are organometalloid compounds containing carbon-silicon bonds and include silanes, siloxides and siloxanes. The covalent bonding of the cyanoacrylate with the amine groups and other reactive sites on the disk carbon overcoat surface blocks the adsorption of contaminants when the contaminants impinge on the surface. Instead of sticking to the surface in a potential energy well, the contaminants rapidly desorb when they kinetically impact the overcoat.

U.S. Pat. No. 6,150,001 describes a magnetic recording disk with a solid continuous film of polycyanate ester that can replace or supplement the protective carbon overcoat. Monomers of cyanate esters are vapor deposited onto the disk and then irradiated with ultraviolet (UV) light to polymerize the deposited monomer to form a solid, robust polycyanate ester overcoat. Unlike cyanoacrylates, the cyanate groups do not attach to reactive sites on the disk but react with one another to form a crosslinked network that comprises the solid continuous film. The cyanoacrylate of this invention is not polymerized into a continuous film. The cyanoacrylate reacts with the surface sites on the overcoat of which there are several per square micron.

In some embodiments, the cyanoacrylate may be applied to the unlubricated carbon overcoat by dipping the disk into a solution containing the cyanoacrylate or by exposing the unlubricated or lubricated overcoat to a cyanoacrylate vapor. In an embodiment where the lubricated disk overcoat is exposed to cyanoacrylate vapor, a selected amount of volatile liquid cyanoacrylate is placed in the drive enclosure before securing the cover. The cover is then installed and the drive is operated in spin-only operation until the nitrogenated surface sites have reacted with the vapor-deposited cyanoacrylate and the remaining liquid cyanoacrylate has polymerized into a solid mass.

After the cyanoacrylate has been applied to the overcoat, the liquid lubricant may be applied. In some embodiments, the liquid lubricant is applied first by dip coating, after which the cyanoacrylate is applied by exposing the lubricated disk overcoat to the cyanoacrylate vapor. The cyanoacrylate then attaches to reactive nitrogenated sites.

The cyanoacrylate may be selected from the group consisting of ethyl, methyl, propyl, isopropyl, perfluoromethyl, perfluoroethyl, perfluoropropyl and perfluoroisopropyl cyanoacrylates.

For a fuller understanding of the nature and advantages of the present invention, reference should be made to the following detailed description taken together with the accompanying figures.

BRIEF DESCRIPTION OF THE DRAWING

FIG. 6 is a table showing the effectiveness, in terms of contaminant susceptibility, of cyanoacrylate passivation for samples with and without lubricant.

DETAILED DESCRIPTION

In one embodiment of the method, unlubricated disks with 2.4 nm thick nitrogenated DLC overcoats with 10 atomic percent nitrogen were dip coated in various concentrations of ethyl-cyanoacrylate in a hydrofluorocarbon solvent (commercially available DuPont Vertrel® XF). One of the cyanoacrylate-treated disks was then rinsed 10 times with the hydrofluorocarbon to verify chemisorption. The cyanoacrylate was 100% bonded to the nitrogenated DLC overcoat. Chemisorption of the cyanoacrylate to the nitrogenated DLC overcoat ensures that it will not rinse off during subsequent lubrication by dip coating with the solution of lubricant in Vertrel® XF solvent.

Figure 1:
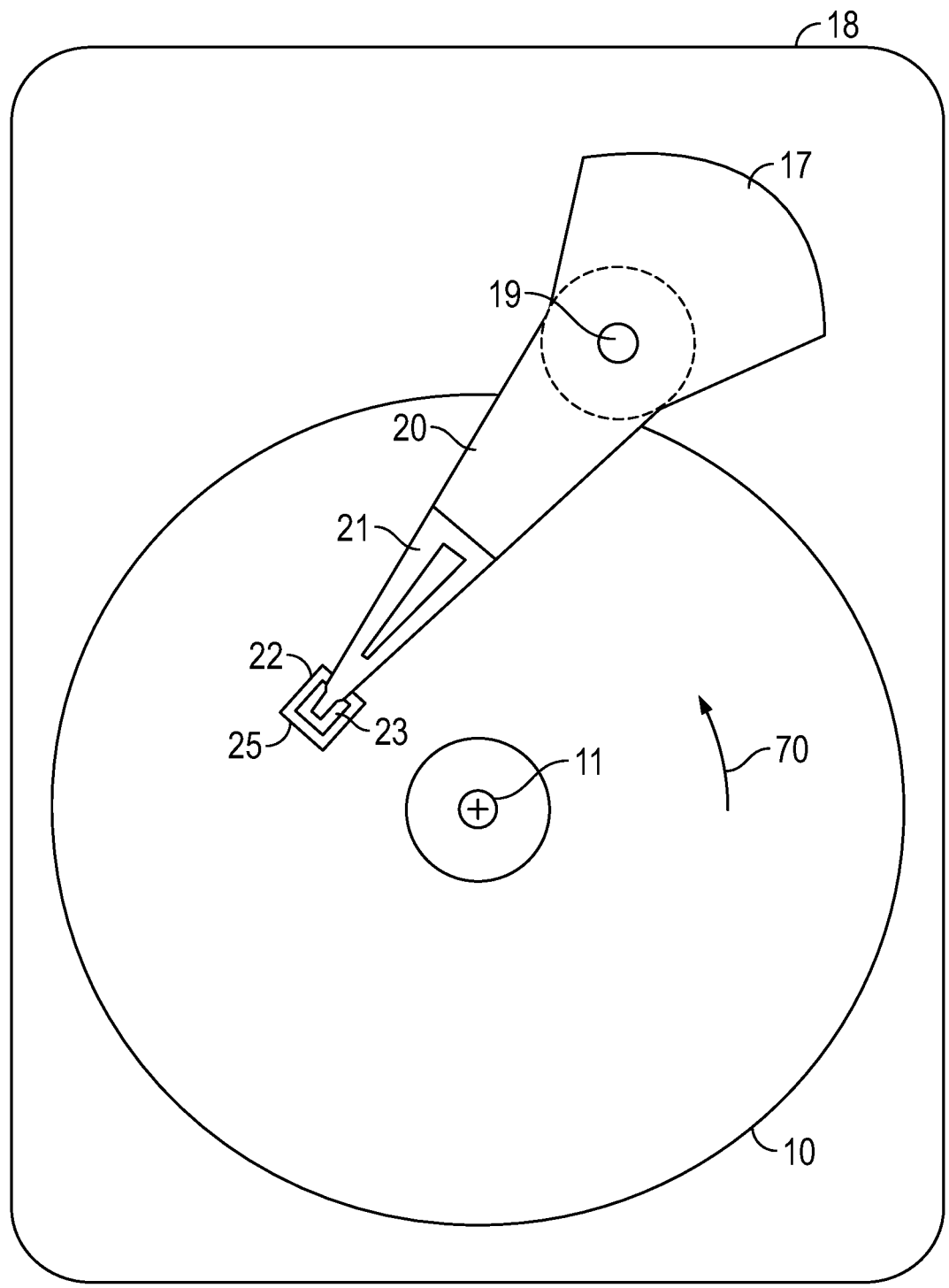
FIG. 1 is a top plan view of a conventional head/disk assembly of a hard disk drive with the cover removed.
Figure 2:
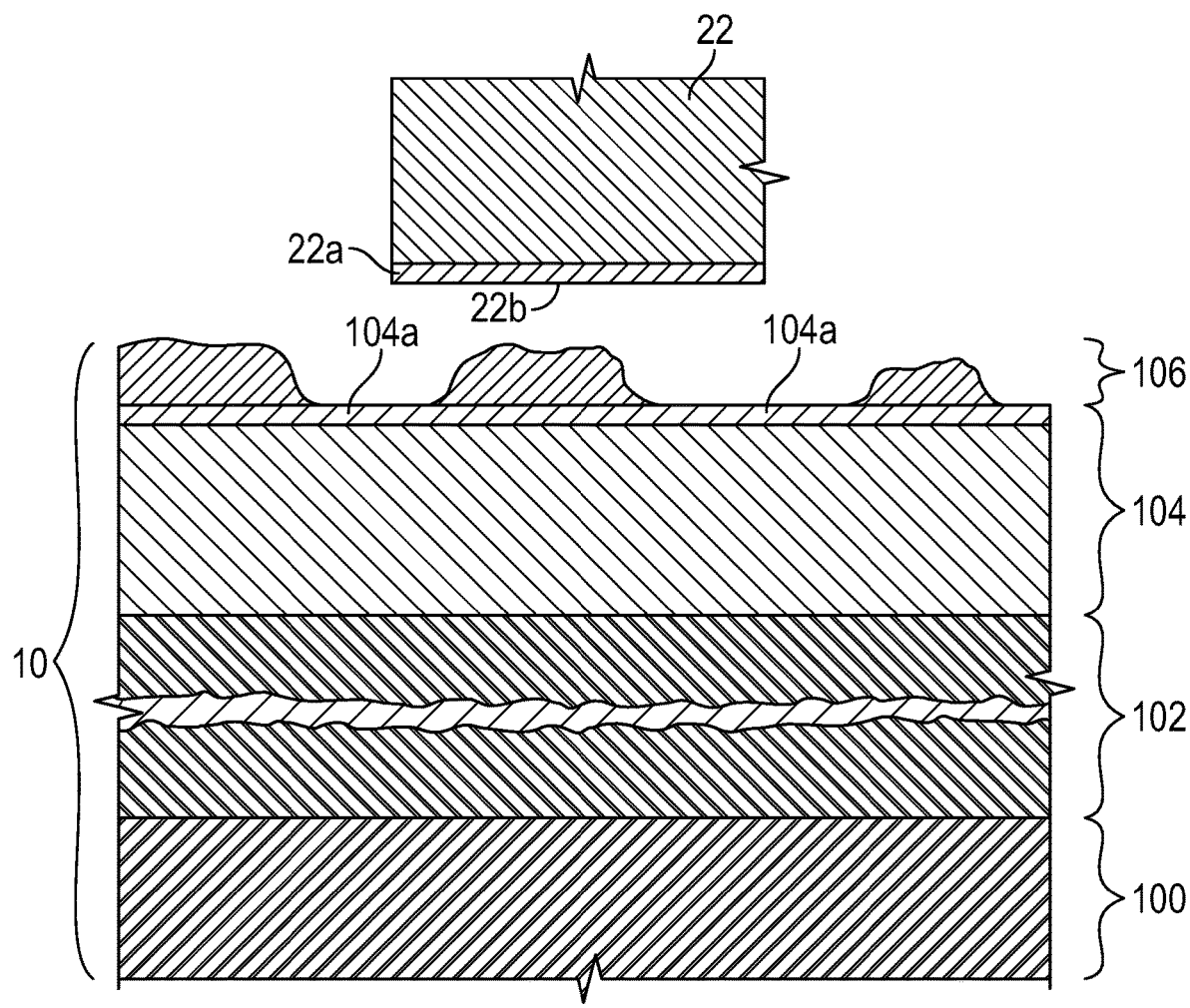
FIG. 2 is a side sectional schematic of an enlarged portion of the disk and slider in the hard disk drive of FIG. 1.
Figure 3:
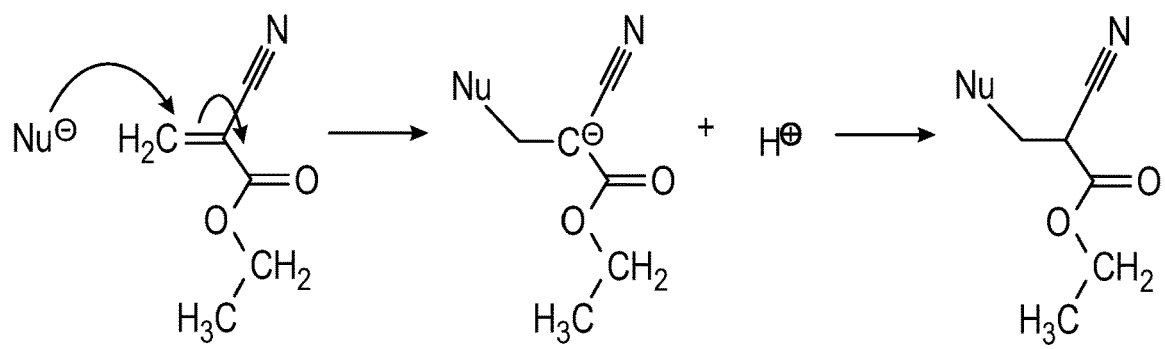
FIG. 3 is a schematic illustration of the nucleophilic initiation and termination of ethyl-cyanoacrylate.
Figure 4:
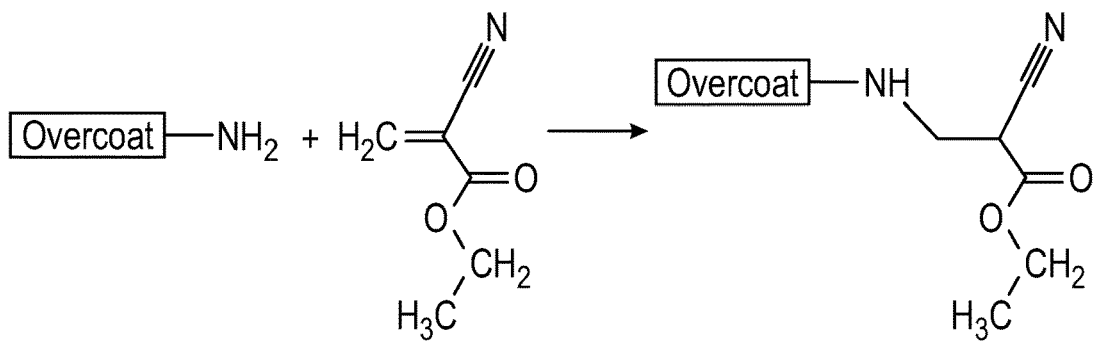
FIG. 4 is a schematic illustration of the reaction of ethyl-cyanoacrylate with a nucleophilic surface amine group ($NH_2$) on the nitrogenated surface of the diamond-like carbon (DLC) overcoat.

FIG. 3 is a schematic illustration of the nucleophilic initiation and termination of ethyl-cyanoacrylate. Nu– is any nucleophile (e– donor). Nucleophilic sites (Nu–) on the DLC overcoat may include amines as well as other types of surface moieties. FIG. 4 is a schematic illustration of the reaction of ethyl-cyanoacrylate with a nucleophilic surface amine group ($NH_2$) on the DLC overcoat.

Figure 5:
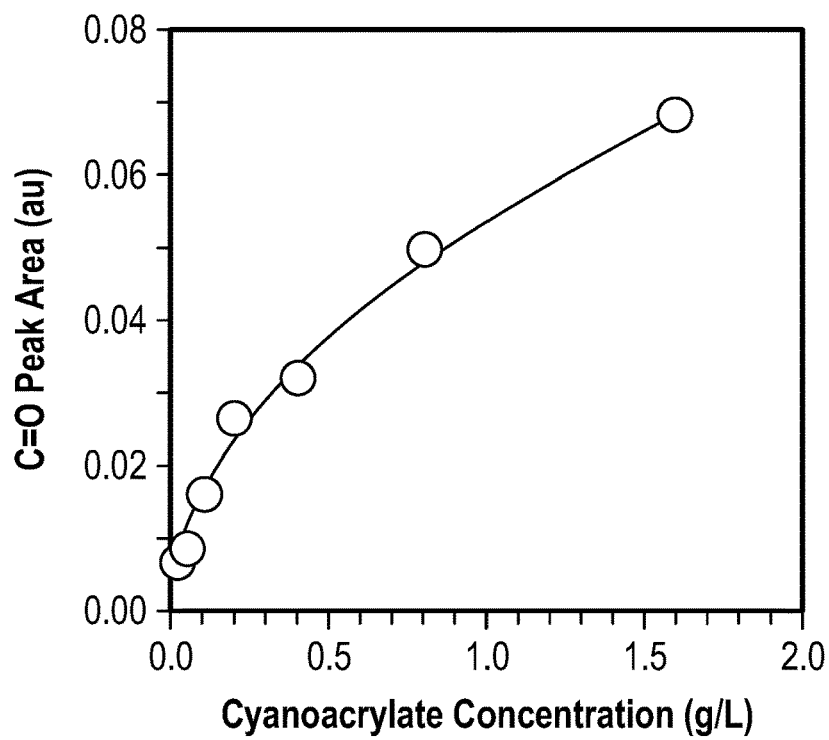
FIG. 5 is a graph of the relative amount of the cyanoacrylate on the DLC overcoat in terms of the reflection FTIR carbonyl peak area as a function of the concentration of cyanoacrylate in the dip coating solution.

After dip coating, the presence of cyanoacrylate on each DLC surface was verified with reflection Fourier transform infrared spectroscopy (FTIR). The carbonyl [C=O] absorbance peak area at 1700 $cm^{-1}$ in the FTIR spectra is due to absorbance at that wavelength by cyanoacrylate molecules. The carbonyl absorbance peak area measured on the disk overcoat decreases with decreasing concentration of cyanoacrylate in the dip coating solution. The background spectrum for the absorbance spectrum is the single beam spectrum of the disk before cyanoacrylate treatment. The relative amount of cyanoacrylate on the DLC overcoat in terms of the carbonyl peak area in dimensionless absorbance units (au) is plotted as a function of the concentration of cyanoacrylate in the dip coating solution in FIG. 5.

The disks with nitrogenated DLC overcoats that were passivated by dipping in the cyanoacrylate solution were then lubricated by dip coating with a PFPE lubricant (commercially available Demnum tetraol). As the amount of cyanoacrylate attached to the nitrogenated DLC overcoat increases, the thickness of deposited lubricant decreases for a given lubricant concentration in the dip coating bath. The cyanoacrylate passivation of the nitrogenated surface sites inhibits the adsorption of lubricant from the dip-coating bath. The lubricant concentration in the dip-coating bath was increased to compensate for the presence of the cyanoacrylate passivation. The lubricant thickness was adjusted by changing the cyanoacrylate concentration and/or the lubricant concentration in the dip-coating bath. The combination of low lubricant thickness and low or zero contamination susceptibility enables reduced head-disk spacing and thus a potential increase in disk areal data density.

The cyanoacrylate-treated and lubricated nitrogenated DLC overcoat surfaces were then subjected to a contaminant challenge test to determine the level of passivation against volatile organic and organosilicon contaminants. The test yields a unitless score that increases with increasing susceptibility to contaminants. Typical values range from 10 to 300, with values under 100 being generally acceptable for reliable disk drive performance.

The contaminant susceptibility of selected samples was measured to evaluate the effectiveness of the cyanoacrylate passivation (with and without lubricant), and the effect of lubricant thickness combined with cyanoacrylate passivation level. The results are shown in the table of FIG. 6. FIG. 6 lists for 9 samples the cyanoacrylate concentration in the hydrofluorocarbon solvent dip-coating bath, the carbonyl [C=O] peak area in au measured by reflection FTIR, the lubricant thickness, and the contaminant test score (relative values). CI is the confidence interval.

FIG. 6 shows that the highest level of cyanoacrylate treatment alone is sufficient to prevent contaminant adsorption on nitrogenated overcoats without lubricant (Line 9). Without cyanoacrylate treatment, the contaminant susceptibility on the unlubricated disk was 363 (Line 6), and trended to zero as the cyanoacrylate concentration was increased to 1.6 g/L. Thus the highest level of cyanoacrylate prevents contaminant adsorption even without lubricant on the disk.

The presence of a 1.19 nm thick lubricant film decreases the contaminant susceptibility from 363 to 72 without cyanoacrylate treatment (Line 1). However, the combination of cyanoacrylate treatment to the C=O peak level of 0.032 au and a 1.17 nm thick lubricant film decreased the contaminant susceptibility to 10 (Line 2). Higher levels of cyanoacrylate treatment completely prevented the contaminant adsorption with only a 0.88 or 0.84 nm thick film of lubricant (Lines 4, 5). Thus, the cyanoacrylate treatment reduces the amount of lubricant required to achieve an acceptable level of contaminant susceptibility. From FIGS. 5 and 6, the preferred amount of cyanoacrylate attached to the nitrogenated carbon layer is an amount, as measured by the carbonyl [C=O] absorbance peak area in reflection Fourier transform infrared spectroscopy (FTIR), that results in an absorbance greater than or equal to 0.02 au and less than or equal to 0.07 au.

As a practical example, a reduction in lubricant thickness by 0.2 nm, from 1.1 nm to 0.9 nm, can provide an areal data density gain of 1%. However, in the prior art the lubricant thickness cannot be reduced because the contamination adsorption at the nitrogenated surface sites forms smears on the sliders. Complete coverage of the overcoat by the lubricant is required because the PFPE contains multiple hydroxyl group substituents that passivate the contamination adsorption sites. However, the passivation of the contamination adsorption sites with cyanoacrylate does not require full coverage of the overcoat surface by the lubricant to block the contaminant adsorption sites. The cyanoacrylate permanently and covalently bonds to the adsorption sites. Thus, the use of cyanoacrylate to passivate exposed nitrogenated surface sites allows for the use of a thinner lubricant layer and potentially thinner carbon overcoats, enabling increased areal data density.

In another embodiment of the method, the disks with nitrogenated DLC overcoats can be treated by exposure to cyanoacrylate vapor, followed by lubrication of the cyanoacrylate-treated disks by dip coating. However, alternatively the lubrication may be performed prior to exposure to the cyanoacrylate vapor. The cyanoacrylate vapor diffuses through the molecularly thin lubricant layer to reach the surface sites. In a test of the vapor-deposition embodiment of the method, disks with lubricated nitrogenated DLC overcoat surfaces were exposed to ethyl-cyanoacrylate vapor. The lubricated disks were exposed to ethyl-cyanoacrylate vapor for 10 or 20 minutes with high and low humidity conditions at 40° C. The vapor phase treatment was performed on a hot plate with the disks supported in the center under a glass dish enclosure. The presence of cyanoacrylate on the overcoats was verified with reflection FTIR. The passivation of the nitrogenated surface sites by the cyanoacrylate vapor treatment was confirmed by the previously described contaminant challenge test. The 10-minute exposure to cyanoacrylate decreased the contaminant adsorption by 42% of its pre-treatment level, while the 20-minute exposure decreased the contaminant adsorption by 56% of its pre-treatment level.

In a variation of the vapor treatment embodiment of the method, a controlled amount of cyanoacrylate can be placed in the disk drive enclosure during manufacturing to passivate the disk overcoat. In the disk drive, the airflow generated by the spinning disk pack distributes the cyanoacrylate vapor over the disk overcoat surface. Cyanoacrylate adsorbs on the disk overcoat surface and reacts by covalently bonding with the reactive groups at the nitrogenated surface sites on the overcoat. Thereby the adsorption sites are passivated before they can be occupied by contaminants emanating from the drive internal components. The method is depicted schematically in FIGS. 7A-7C.

Figure 7A:
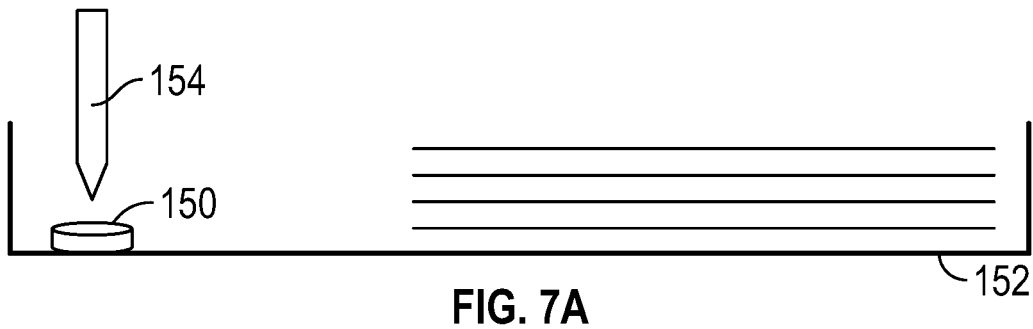
FIGS. 7A-7C illustrate a method for vapor depositing cyanoacrylate on the lubricated disk overcoats in the disk drive enclosure during manufacturing.
Figure 7B:
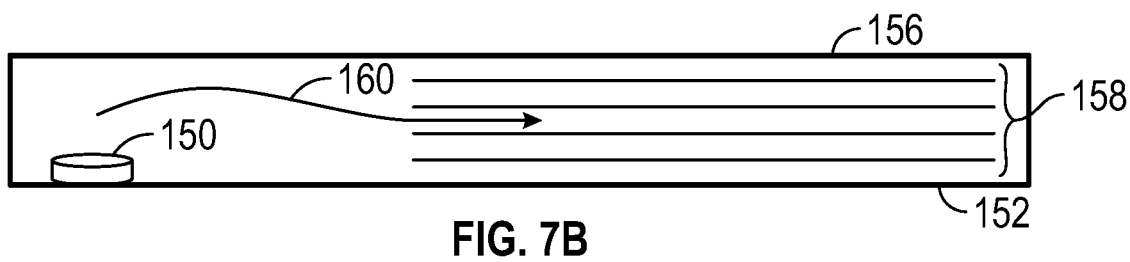
Figure 7C:
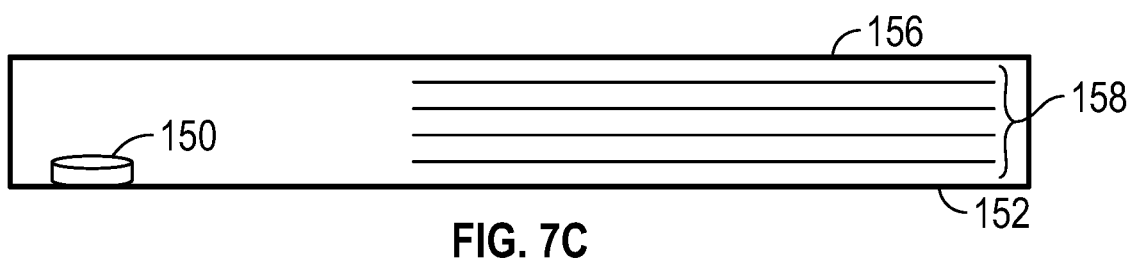

As shown in FIG. 7A, a controlled amount of volatile liquid cyanoacrylate 150 is deposited in the base 152 of the drive by a dropper 154 or other delivery device. In FIG. 7B, the cover 156 is then installed and the drive is operated to cause rotation of the disk pack 158. The spin-only operation of the drive distributes cyanoacrylate vapor, as shown by arrow 160, over the disk surfaces to react with the nitrogen surface sites on the disk overcoats. In FIG. 7C, the remaining cyanoacrylate 150 polymerizes into an inert solid mass and remains attached to the base casting in the drive enclosure.

In one example for the in-drive cyanoacrylate vapor deposition method shown in FIGS. 7A-7C, the disk drive cover was removed in a clean environment. An antiwetting agent (AWA) encircled the cyanoacrylate droplet to prevent the cyanoacrylate droplet from spreading uncontrollably on the drive base. A controlled amount of ethyl-cyanoacrylate (2.5 mg) was placed inside the AWA-treated region of the base. The cyanoacrylate vapor was distributed throughout the drive for 17 hours at ambient conditions using a spin-only drive circuit board. Then, the original circuit board was replaced on the drive.

A test was then performed to evaluate the effect of the in-situ cyanoacrylate treatment on the time to failure (TTF) in the presence of a contamination source. Two identical drives, one with in-situ passivation by cyanoacrylate and one reference drive without passivation were intentionally contaminated by adding 1 µL of a liquid containing a volatile organosilicon contaminant. The contaminant is known to form smears on the sliders during accelerated life testing at 65° C. The drive with cyanoacrylate treatment exhibited a TTF four times longer than the TTF for the reference drive.

The invention has been described with primary application to nitrogenated DLC overcoats on magnetic recording disks. However, the invention is fully applicable to nitrogenated DLC overcoats on disk drive sliders, as well as to nitrogenated DLC surfaces in general.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for protecting a diamond-like carbon overcoat with a nitrogenated surface on a magnetic recording disk from chemical contaminants, the method comprising:
    providing a disk substrate having a magnetic recording layer and a diamond-like carbon overcoat with a nitrogenated surface on the recording layer, the overcoat having nucleophilic surface sites; and
    exposing the nitrogenated surface of the overcoat to a cyanoacrylate to attach cyanoacrylate to the surface sites.

2. The method of claim 1 wherein exposing the surface of the overcoat to a cyanoacrylate comprises one from the group of dipping the overcoat into a solution containing the cyanoacrylate and exposing the surface of the overcoat to a cyanoacrylate vapor.

3. The method of claim 1 wherein the overcoat comprises a first film comprising carbon and a second film consisting essentially of nitrogenated carbon on the first film.

4. The method of claim 1 further comprising, after exposing the surface of the overcoat to a cyanoacrylate, applying a liquid lubricant to the overcoat.

5. The method of claim 1 wherein the cyanoacrylate is selected from the group consisting of ethyl, methyl, propyl, isopropyl, perfluoromethyl, perfluoroethyl, perfluoropropyl and perfluoroisopropyl cyanoacrylates.

6. A substrate comprising:
    a nitrogenated diamond-like carbon layer having a nitrogenated surface with nucleophilic surface sites, wherein the substrate is a magnetic recording disk having a magnetic recording layer and the carbon layer is a protective overcoat for the recording layer; and
    cyanoacrylate molecules on the nitrogenated surface and attached to the nucleophilic surface sites.

7. The substrate of claim 6 wherein the amount of cyanoacrylate attached to the nucleophilic surface sites on the nitrogenated surface, as measured by the carbonyl

[C=O] peak area in reflection Fourier transform infrared spectroscopy (FTIR), is greater than 0.02 absorbance units and less than or equal to 0.07 absorbance units.

8. A magnetic recording disk comprising:
   a disk substrate;
   a magnetic recording layer on the substrate;
   a nitrogenated diamond-like carbon overcoat on the recording layer, the overcoat having surface sites containing nitrogen; and
   cyanoacrylate attached to the nitrogenated surface sites.

9. The disk of claim 8 further comprising a discontinuous film of liquid lubricant on the overcoat.

10. The disk of claim 8 wherein the cyanoacrylate is selected from the group consisting of ethyl, methyl, propyl, isopropyl, perfluoromethyl, perfluoroethyl, perfluoropropyl and perfluoroisopropyl cyanoacrylates.

11. The disk of claim 8 wherein the amount of cyanoacrylate attached to the surface sites, as measured by the carbonyl [C=O] peak area in reflection Fourier transform infrared spectroscopy (FTIR), is greater than 0.02 absorbance units and less than or equal to 0.07 absorbance units.

12. The disk of claim 8 wherein the surface sites are amines.

13. A magnetic recording disk drive comprising:
    the disk of claim 8;
    a spindle motor for rotating the disk;
    an air-bearing slider supporting a head;
    an actuator attached to the slider for moving the head across the disk; and
    an enclosure surrounding the disk, spindle motor, slider and actuator.

14. The disk drive of claim 13 wherein the disk drive contains volatile organosilicon contaminants within the enclosure, and wherein the nitrogen surface sites are passivated from the contaminants by the cyanoacrylates.

15. The disk drive of claim 13 further comprising a mass of polymerized cyanoacrylate in the enclosure.

16. A method for protecting a diamond-like carbon overcoat with a nitrogenated surface on a magnetic recording disk from chemical contaminants, the method comprising:
    providing a disk substrate having a magnetic recording layer, a diamond-like carbon overcoat with a nitrogenated surface on the recording layer, the overcoat having nucleophilic surface sites, and a permeable layer of liquid lubricant on the surface of the overcoat; and
    exposing the nitrogenated surface of the overcoat to a cyanoacrylate vapor through the permeable layer of liquid lubricant to attach cyanoacrylate to the surface sites.

17. A method for protecting a diamond-like carbon overcoat with a nitrogenated surface on a magnetic recording disk from chemical contaminants, the method comprising:
    providing a rotatable disk located within an enclosure, the disk comprising a substrate, a magnetic recording layer on the substrate, and a diamond-like carbon overcoat with a nitrogenated surface on the recording layer, the overcoat having nucleophilic surface sites; and
    exposing the nitrogenated surface of the overcoat to a cyanoacrylate to attach cyanoacrylate to the surface sites by depositing liquid cyanoacrylate in the enclosure and rotating the disk.

18. A method for protecting a diamond-like carbon layer with a nitrogenated surface from chemical contaminants, the method comprising:
    providing a substrate comprising a diamond-like carbon layer with a nitrogenated surface, the carbon layer having nucleophilic surface sites, wherein the substrate is a magnetic recording disk drive air-bearing slider and the carbon layer is the air-bearing surface of the slider; and
    exposing the nitrogenated surface of the carbon layer to a cyanoacrylate to attach cyanoacrylate to the surface sites.

19. A method for protecting a diamond-like carbon layer with a nitrogenated surface from chemical contaminants, the method comprising:
    providing a substrate comprising a diamond-like carbon layer with a nitrogenated surface, the carbon layer having nucleophilic surface sites, wherein the substrate is a magnetic recording disk comprising a magnetic recording layer and the carbon layer is a protective overcoat for the recording layer; and
    exposing the nitrogenated surface of the carbon layer to a cyanoacrylate to attach cyanoacrylate to the surface sites.

20. A substrate comprising:
    a nitrogenated diamond-like carbon layer having a nitrogenated surface with nucleophilic surface sites, wherein the substrate is a magnetic recording disk drive air-bearing slider and the carbon layer is the air-bearing surface of the slider; and
    cyanoacrylate molecules on the nitrogenated surface and attached to the nucleophilic surface sites.

* * * * *